United States Patent [19]

Seferian et al.

[11] 4,006,004
[45] Feb. 1, 1977

[54] PHOSPHATE ENRICHED PEAT MOSS FERTILIZER AND METHOD THEREFOR INCLUDING FREE AMINO ACID SUPPLEMENTATION

[75] Inventors: Rupen B. Seferian, Pasadena; Roy M. Kaprielian, San Marino; Joseph B. Michaelson, North Hollywood, all of Calif.

[73] Assignees: Rupen B. Seferian, Pasadena; Roy M. Kaprielian, San Marino, both of Calif.

[22] Filed: Aug. 25, 1975

[21] Appl. No.: 607,206

[52] U.S. Cl. .................................. 71/11; 71/24; 71/41; 71/64 G; 260/529
[51] Int. Cl.$^2$ .................. C05B 15/00; C05F 11/02
[58] Field of Search .......... 71/11, 12, 21, 24, 64 G, 71/41; 260/529, 534

[56] References Cited

UNITED STATES PATENTS

| | | | |
|---|---|---|---|
| 1,668,464 | 5/1928 | Pease | 71/24 |
| 2,685,601 | 8/1954 | Buck et al. | 260/529 |

OTHER PUBLICATIONS

Chem. Abs. vol. 74, 1971, p. 259, 31134d, Gordienko et al.
Chem. Abs. vol. 75, 1971, p. 70, 89856c, Zhorobekova et al.
Chem. Abs. vol. 77, 1972, p. 333, 112915y, Evdokimova et al.
Chem. Abs. vol. 75, 1971, p. 366, 19220s, Evdokimova et al.
Chem. Abs. vol. 79, 1973, p. 381, 4340g, Yukhnin.
Chem. Abs. vol. 75, 1971, p. 239, 139793, Shchutskaya.

Primary Examiner—Frank A. Spear, Jr.
Assistant Examiner—Ferris H. Lander
Attorney, Agent, or Firm—Louis J. Bachand

[57] ABSTRACT

Phosphate enriched, potassium supplemented peat moss fertilizer produce and method of production including reaction of peat moss with a solution of alkali metal acid phosphate salt in orthophosphoric acid, in some cases with prolonged hydrolysis reaction at elevated temperatures to hydrolyze peat moss protein to free amino acids.

16 Claims, No Drawings

PHOSPHATE ENRICHED PEAT MOSS FERTILIZER AND METHOD THEREFOR INCLUDING FREE AMINO ACID SUPPLEMENTATION

BACKGROUND OF THE INVENTION

A phosphate enriched peat moss fertilizer is prepared by reaction of peat moss with an acid phosphate reactant comprising phosphoric acid such as orthophosphoric acid and an acid phosphate salt such as and particularly monopotassium acid phosphate.

In particular embodiments the invention further relates to the mineral supplementation of peat moss fertilizers by the addition of phosphate and by the addition of potassium.

In further embodiments of the invention, the reaction of phosphoric acid with peat moss is continued at elevated temperatures and for a prolonged period and in the presence of a buffering quantity of alkali metal acid phosphate salt, effecting hydrolysis of the protein content of the peat moss and the generation of free amino acids.

The invention further relates to method for production of phosphate enriched peat moss, potassium enriched peat moss, and free amino acid containing peat moss fertilizer products.

PRIOR ART

Phosphate modification of peat or peat moss is known, however, not as described herein and applicants are unaware of other workers in the art who have carried the phosphate modification of peat moss with or without the conjoint presence of alkali metal acid salt as taught herein for prolonged periods e.g. 4 hours and more and at elevated temperatures e.g. 75° or 90° C for times sufficient to generate free amino acids by hydrolysis of proteins occuring within the peat moss. Representative of prior art in the area of modification of peat moss as a fertilizer material are these patents: U.S. Pat. No. 23,467 to Hyde, U.S. Pat. No. 838,108 to Hammerschlag, U.S. Pat. No. 1,002,248 to Ellis, U.S. Pat. No. 1,048,454 to Bash, U.S. Pat. No. 1,320,701 to Manns, U.S. Pat. No. 1,584,130 to Pease, U.S. Pat. No. 1,610,109 also to Pease, U.S. Pat. No. 1,668,464 also to Pease, U.S. Pat. No. 3,307,934 to Palmer et al, and U.S. Pat. 3,573,892 to Atkins et al.

SUMMARY OF THE INVENTION

The invention has for its purpose the preparation of an improved fertilizer material, one comprising peat moss as the basic ingredient and having provision for supplementation of the peat moss with mineral and elemental materials specifically phosphate and potassium known to be beneficial to plant life and as well in certain embodiments the provision of free amino acids which, as is known, are directly assimmilable into the plant structure and which therefore are extremely efficient in the soil in plant nutrition.

In accordance with the purposes of the invention there is provided method for the production of phosphate enriched high organic content fertilizer comprising peat moss, including the steps of reacting the peat moss with at least one part by weight of an acid phosphate reactant per one part of peat moss, the reactant comprising a mixture of one part by weight of an alkali metal acid phosphate and from one to eight parts by weight of orthophosphoric acid, and recovering the product. In preferred embodiments the salt is monopotassium phosphate but the acid phosphate salt may have the formula $MeH_2PO_4$ wherein the Me is an alkali metal selected from potassium, sodium, lithium and cesium. In other embodiments the acid phosphate salt may have the formula $Me_2HPO_4$ in which the metal is an alkali metal as mentioned. The orthophosphoric acid may be used as an aqueous solution containing about 85 percent by weight of the acid i.e. commercial orthophosphoric acid.

In certain embodiments it is preferred that the peat moss be first slurried in water prior to effecting reaction with the acid phosphate reactant.

Accordingly and in preferred carrying out of the invention there is provided method for the production of phosphate enriched high organic fertilizer comprising peat moss, including the steps of slurrying peat moss in up to five parts by weight of water per part of peat moss, mixing an acid phosphate reactant solution of one part by weight of monopotassium acid phosphate in from one to four parts of orthophosphoric acid with the peat moss slurry in an amount of one to four parts by weight of the acid phosphate reactant per part of peat moss and recovering the product.

In further embodiments of the invention three amino acids are generated within the enriched peat moss fertilizer product. In this respect the invention provides a method of producing free amino acids in the fertilizer product produced as above by heating the product at an elevated temperature above about 75° C for several hours and recovering the product. Typically, heating is continued for not less than 4 hours and preferably heating is carried out at about 90° C.

Accordingly, in a preferred form of the process there is provided method for the production of free amino acid-containing phosphate-enriched high organic content fertilizers comprising peat moss, including slurrying peat moss in up to five parts by weight of water per part of peat moss, mixing acid phosphate reactant solution of one part by weight of monopotassium acid phosphate with from one to four parts of orthophosphoric acid with the peat moss slurry in an amount of one to four parts by weight of the acid phosphate reactant per part of peat moss, heating the resulting mixture at about 90° C for not less than 4 hours to hydrolyze proteinaceous material in the peat moss into free amino acid, and recovering as product a peat moss fertilizer containing free amino acid, and enriched with phosphate and potassium.

The invention further relates to the products obtained by the foregoing methods.

DESCRIPTION OF THE PREFERRED EMBODIMENTS

The term "peat moss" or sometimes simply "peat" is used herein to refer to putrified and decayed vegetable and animal matter naturally occuring as a result of slow decomposition and animal and vegetable material in the ground under typically damp conditions. As such, peat moss is a material rich in nitrogen, protein, and numerous elements useful in plant nutrition. With the further benefit that peat moss is a natural soil conditioner as well as a possible source of nutrients for plants. It is with the amplification of the plant nutritional aspects of peat moss that the present invention is particularly concerned. That is, there is provided by the present invention peat moss modified to contain phosphate mineral and in preferred embodiments potassium element whereby the nutritional characteristics of peat moss are substantially enhanced and its overall value as a soil conditioner, nutrient, fertilizer and beneficiator of the growing process are highly developed.

Specifically the invention provides for reacting peat moss with phosphoric acid in the first instance, but only in the presence of an acid salt of phosphoric acid whereby the reaction conditions are ameliorated to an extent permitting the effective reaction of phosphoric acid with the peat moss fertilizer. In addition, particularly where the acid phosphate salt is the monopotassium or dipotassium acid phosphate salt there is further added to the soil a quantity of potassium which is a necessary nutrient for plants.

As the phosphoric acid reactant we prefer to use orthophosphoric acid particularly in its commercial form i.e. 85 percent $H_3PO_4$ in aqueous solution.

As the acid phosphate salt reactant we prefer to employ an alkali metal i.e. potassium, sodium, lithium, or cesium metal, mono- or di- acid salt as the salt reagent in the process.

In practice the peat moss is slurried in water to facilitate mixing of the peat moss and acid phosphate reactant. Typical proportions are for each part of peat moss from one to eight parts and preferably up to five parts by weight of water.

Following slurrying of the peat moss the acid phosphate reactant is prepared. Typically, this is accomplished by dissolving in phosphoric acid the particular salt e.g. and for illustrative purposes monopotassium phosphate. The ratio of monopotassium salt as an illustration to phosphoric acid is in the range of, for each part of monopotassium acid phosphate salt, from one to four parts of orthophosphoric acid. In general, from one to four parts by weight of the acid phosphate reactant material comprising both the phosphoric acid and the acid phosphate salt is employed in the range of from one to four parts of the acid phosphate reactant per part of peat moss in the slurry.

The reaction is generally effected at room temperature and proceeds nicely in an aqueous slurry of peat moss with the concentrations of acid phosphate reactant set out. After reaction, the reaction product is dried and may be applied directly as fertilizer for an improved result in plant nutrition and soil supplementation.

As noted above, the invention further provides for the production of free amino acids within the modified fertilizer product prepared as just described. For this purpose, the proteinaceous material within the peat moss is hydrolyzed under particular conditions leading to the generation of free amino acid. It is believed, while not wishing to be bound to any particular theory, that the hydrolysis of proteinaceous material within peat moss produces usable free amino acids in the product while apparently similar processes do not, by virtue of the conjoint presence of both phosphoric acid and a complimentary phosphate salt such that the pH of the acid is buffered to approximately 25% to 50 percent higher than the acid per se whereby hydrolysis proceeds even at the elevated temperatures and for the prolonged heating periods recommended herein in such manner as to provide by virtue of the buffered hydrolysis such amino acids as cuistein phosphate, arginine phosphate, alanine phosphate, glycine phosphate, and histadine phosphate, and others.

It is noteworthy that in view of the buffered condition of the reaction system, amino acids generated are not destroyed and are thereby retained for use by the plant. It is known that amino acids may be directly assimilated by the plants and therefore the nutritional effect is immediate and remarkable.

The invention will be further described as to illustrative embodiments in the following examples in which all parts and percentages are by weight.

EXAMPLE 1

Peat moss, one part by weight, was slurried with water, five parts by weight, and thereto there was added one part by weight of an acid phosphate reactant comprising 0.5 part by weight of monopotassium acid phosphate and 0.5 part by weight of orthophosphoric acid. The slurry and acid phosphate reactant solution were stirred together and the product recovered by drying.

EXAMPLE 2

The reaction conditions of Example 1 were duplicated with the generation of free amino acids by heating the reaction product at 75° C for 4 hours. There was produced a reaction product, which exhibited a positive test for free amino acids.

EXAMPLE 3

Example 1 is duplicated employing four parts by weight of the acid phosphate reactant per part of peat moss.

EXAMPLE 4

Example 1 is duplicated employing as the acid phosphate reactant solution one containing 0.5 part of monopotassium acid phosphate and 2 parts of orthophosphoric acid. Results were equivalent.

EXAMPLE 5

Example 1 is duplicated employing 8 parts by weight of water per part of peat moss in slurrying the peat moss. Results were equivalent.

EXAMPLE 6

Example 1 is duplicated employing as the acid phosphate reactant an also phosphoric solution of an alkali metal acid salt selected from sodium, lithium, and cesium, mono- and dihydrogen acid phosphate salts. Results were equivalent.

EXAMPLE 7

Example 2 is duplicated using 90° C as the reaction temperature and heating for 4.5 hours. The reaction product tests positively for free amino acid.

The products of Examples 1 through 7 are tested for fertilizing efficiency in a truck garden by blending into the soil at the level of 1 bale per 1000 square feet the fertilizer products obtained. Garden vegetables are grown in the area and the results observed. It is noted that the plants are healthy, rapid growing and heavy bearing of fruit, the amino acid contining fertilizer areas having somewhat swifter results.

We claim:

1. Method for the production of phosphate enriched high organic content fertilizer comprising peat moss, including reacting said peat moss with at least one part by weight of an acid phosphate reactant per one part of peat moss, said reactant comprising a mixture of one part by weight of an alkali metal acid phosphate salt and from one to eight parts by weight of orthophosphoric acid, and recovering the product.

2. Method according to claim 1 in which said salt is monopotassium phosphate.

3. Method according to claim 1 in which said salt is the formula $MeH_2PO_4$ wherein Me is an alkali metal selected from potassium, sodium, lithium cesium.

4. Method according to claim 1 in which the salt has the formula $Me_2HPO_4$ in which Me is an alkali metal selected from the group consisting of potassium, sodium, lithium, and cesium.

5. Method according to claim 1 in which said orthophosphoric acid is an aqueous solution containing about 85 percent by weight of the acid.

6. Method according to claim 1 including also preliminarily slurrying the peat moss in water.

7. Method for the production of phosphate enriched high organic content fertilizer comprising peat moss, including slurrying peat moss in up to five parts by weight of water per part of peat moss, mixing an acid phosphate reactant solution of one part by weight of monopotassium acid phosphate in from one to four parts of orthophosphoric acid with said peat moss slurry in an amount of one to four parts by weight of said acid phosphate reactant per part of peat moss, and recovering the product.

8. Method according to claim 7 including producing free amino acids in said fertilizer product by heating said product at an elevated temperature above about 75° C for several hours, and recovering the product.

9. Method according to claim 8 in which heating is continued for not less than 4 hours.

10. Method according to claim 8 in which heating is carried out at about 90° C.

11. Method according to claim 8 in which heating is carried out at about 90° C for not less than 4 hours.

12. Method for the production of free amino acid-containing, phosphate-enriched high organic content fertilizers comprising peat moss, including slurrying peat moss in up to five parts by weight of water per part of peat moss, mixing acid phosphate reactant solution of one part by weight of monopotassium acid phosphate with from one to four parts of orthophosphoric acid with said peat moss slurry in an amount of one to four parts by weight of said acid phosphate reactant per part of peat moss, heating the resulting mixture at about 90° C for not less than 4 hours to hydrolyze proteinaceous material in said peat moss into free amino acid, and recovering as product a peat moss fertilizer containing free amino acid, and enriched with phosphate and potassium.

13. Product produced by the method of claim 1.
14. Product produced by the method of claim 7.
15. Product produced by the method of claim 11.
16. Product produced by the method of claim 12.

* * * * *